(12) United States Patent
Brown, Jr. et al.

(10) Patent No.: US 11,897,765 B2
(45) Date of Patent: Feb. 13, 2024

(54) CARBON DIOXIDE CAPTURE, PRODUCTS INCORPORATING OR PRODUCED USING CAPTURED CARBON DIOXIDE, AND ECONOMIC BENEFITS ASSOCIATED WITH SUCH PRODUCTS

(71) Applicant: 8 Rivers Capital, LLC, Durham, NC (US)

(72) Inventors: Glenn William Brown, Jr., Durham, NC (US); Brock Alan Forrest, Durham, NC (US); Damian Beauchamp, Hillsborough, NC (US)

(73) Assignee: 8 RIVERS CAPITAL, LLC, Durham, NC (US)

( * ) Notice: Subject to any disclaimer, the term of this patent is extended or adjusted under 35 U.S.C. 154(b) by 856 days.

(21) Appl. No.: 16/913,893

(22) Filed: Jun. 26, 2020

(65) Prior Publication Data

US 2020/0407222 A1 Dec. 31, 2020

Related U.S. Application Data

(60) Provisional application No. 62/867,096, filed on Jun. 26, 2019.

(51) Int. Cl.
| | |
|---|---|
| *C01B 13/16* | (2006.01) |
| *C01B 32/60* | (2017.01) |
| *B01D 53/62* | (2006.01) |
| *F01K 25/10* | (2006.01) |
| *G06Q 10/04* | (2023.01) |
| *G06Q 40/10* | (2023.01) |
| *G06Q 30/0283* | (2023.01) |

(52) U.S. Cl.
CPC .............. *C01B 13/16* (2013.01); *B01D 53/62* (2013.01); *C01B 32/60* (2017.08); *F01K 25/103* (2013.01); *G06Q 10/04* (2013.01); *G06Q 40/10* (2013.01); *B01D 2257/504* (2013.01); *G06Q 30/0283* (2013.01)

(58) Field of Classification Search
CPC ......... C01B 13/16; C01B 32/60; B01D 53/62; B01D 2257/504; F01K 25/103
See application file for complete search history.

(56) References Cited

U.S. PATENT DOCUMENTS

| | | | | |
|---|---|---|---|---|
| 8,596,075 | B2 * | 12/2013 | Allam | F02C 3/20 |
| | | | | 60/39.5 |
| 8,776,532 | B2 * | 7/2014 | Allam | F25J 3/04563 |
| | | | | 60/39.464 |
| 9,546,814 | B2 * | 1/2017 | Allam | F25J 3/0409 |
| 9,850,815 | B2 * | 12/2017 | Allam | F25J 3/04018 |
| 10,683,237 | B2 * | 6/2020 | Lee | B01F 35/2211 |
| 2008/0138265 | A1 | 6/2008 | Lackner et al. | |
| 2012/0121488 | A1 | 5/2012 | Comrie | |
| 2019/0060820 | A1 | 2/2019 | O'Connor | |

* cited by examiner

*Primary Examiner* — Sikarl A Witherspoon
(74) *Attorney, Agent, or Firm* — Womble Bond Dickinson (US) LLP

(57) ABSTRACT

The present disclosure provides methods whereby products can be prepared in a manner that adds value to the products beyond the market value of such products, and the present disclosure further provides methods for optimizing production of products toward processes that yield a positive net result. The methods for preparing a product can utilize a synthesized oxide compound and, depending upon the order of combination, can modify the synthesized oxide compound by combination with both of carbon dioxide and a secondary component.

33 Claims, 3 Drawing Sheets

CARBON DIOXIDE CAPTURE, PRODUCTS INCORPORATING OR PRODUCED USING CAPTURED CARBON DIOXIDE, AND ECONOMIC BENEFITS ASSOCIATED WITH SUCH PRODUCTS

CROSS-REFERENCE TO RELATED APPLICATIONS

The present application claims priority to U.S. Provisional Patent Application No. 62/867,096, filed Jun. 26, 2019, the disclosure of which is incorporated herein by reference.

FIELD OF THE DISCLOSURE

The present disclosure relates to carbon capture and/or sequestration that is carbon-reduced, net carbon neutral, or net carbon negative. More particularly, the present disclosure relates to materials that are modified for capture and/or sequestration of carbon dioxide, and that are themselves formed from carbon neutral or carbon negative components or carbon that is either removed from the atmosphere or is prevented from reaching the atmosphere. The present disclosure further encompasses methods for monetization of one or more economic benefits or incentives that are or will become available from one or more third parties (private or public), such economic benefits or incentives being associated with products that have been formed to be lower carbon, carbon neutral, or carbon negative arising directly from the incorporation of carbon dioxide therein, and/or from being prepared using at least one carbon-depleted component.

BACKGROUND

There is an ever-increasing desire throughout the world for means for reducing carbon emissions (particularly carbon dioxide) as well as capturing carbon dioxide (whether from an anthropogenic or atmospheric source) to effectively reduce the amount of carbon dioxide present in the atmosphere. Despite the environmental benefit associated with this goal, the economic impact, particularly in relation to existing industrial practices, has remained a significant hurdle to implementation of sustainable solutions.

To offset the economic impact of implementing carbon neutral and carbon negative industrial practices, both public and private entities have instituted various programs offering economic benefits and/or incentives for undertaking such industrial practices. For example, the Bipartisan Budget Act of 2018 instituted reformations of 26 U.S.C. § 45Q ("Credit for Carbon Oxide Sequestration") that are intended to increase investment of private capital in carbon capture technologies in various industries, such as electric power generation, ethanol and fertilizer production, natural gas processing, chemicals production, refining, manufacture of steel and cement, and direct air capture. In order to improve implementation of carbon neutral and carbon negative industrial practices, there remains a need in the art for products that incorporate captured carbon dioxide and are useful for downstream utilization, for methods of providing such products, and for methods of monetization of the economic benefits and/or incentives (e.g., tax credits) that may be associated with such products, the formation thereof, and the use thereof.

SUMMARY OF THE DISCLOSURE

The present disclosure relates to carbon capture and/or sequestration that, depending on the system boundary definitions, is lower carbon to net carbon neutral and is preferably net carbon negative. More particularly, the present disclosure relates to materials that are modified for sequestration or utilization of carbon dioxide either directly or indirectly through the incorporation of carbon dioxide into other chemicals or complex of chemicals. The present disclosure further relates to methods for realizing economic benefits and/or incentives that may be associated with carbon capture and/or sequestration into materials and with products that may thereafter be formed from such materials.

In one or more embodiments, the present disclosure can provide methods for preparing a product. The methods, in particular, can be effective to impart economic benefit to the product beyond a typical market value due at least in part to the manner of production that is beneficial to the climate and/or in carbon management. Specifically, the manner of production can have a reduced-carbon effect, can be carbon neutral, or can be carbon negative. In some embodiments such method can comprise: combining a synthesized oxide compound with a secondary component to form an intermediate material; and adding carbon dioxide to the intermediate material such that at least a majority of the carbon dioxide that is added to the intermediate material is combined with the intermediate material to form a carbon-modified product that has an economic benefit associated therewith. In further embodiments, such methods can be defined in relation to one or more of the following statements, which can be combined in any number and order.

The method further can comprise forming the synthesized oxide compound.

Forming the synthesized oxide compound can comprise removing carbon dioxide from a starting carbonate compound.

At least a portion of the carbon dioxide that is removed from the starting carbonate compound can be carbon-captured.

The synthesized oxide compound can comprise one or more of an alkali oxide compound, an alkaline oxide compound, a transition metal oxide compound and a crystallogen oxide compound.

The secondary component can comprise one or more of a silicate, an alumina, an oxide, water, a cellulose-based component, a lignin-based component, and a hemicellulose-based component.

The carbon-modified product can include one or more of a concrete product, a steel product, an asphalt product, and a plastic product.

The method further can comprise determining a net benefit of the carbon-modified product as a difference between a value of the economic benefit associated with the carbon-modified product and a cost associated with preparing the carbon-modified product.

In further embodiments, methods according to the present disclosure can comprise: adding carbon dioxide to a synthesized oxide compound that is at least partially in solid form such that at least a majority of the carbon dioxide reacts with the synthesized oxide compound to form a synthesized carbonate compound that is at least partially in solid form; and combining the synthesized carbonate compound with a secondary component to form a carbon-modified product that has an economic benefit associated therewith. Further, the methods can be defined in relation to one or more of the following statements, which can be combined in any number and order.

The method further can comprise forming the synthesized oxide compound.

Forming the synthesized oxide compound can comprise removing carbon dioxide from a starting carbonate compound.

At least a portion of the carbon dioxide that is removed from the starting carbonate compound can be carbon-captured.

The synthesized oxide compound can comprise one or more of an alkali oxide compound, an alkaline oxide compound, a transition metal oxide compound and a crystallogen oxide compound.

The secondary component can comprise one or more of a silicate, an alumina, an oxide, water, a cellulose-based component, a lignin-based component, and a hemicellulose-based component.

The carbon-modified product can include one or more of a concrete product, a steel product, an asphalt product, and a plastic product.

The method further can comprise determining a net benefit of the carbon-modified product as a difference between a value of the economic benefit associated with the carbon-modified product and a cost associated with preparing the carbon-modified product.

In one or more embodiments, the present disclosure can relate to methods for optimizing production of products. Such methods can include carrying out one or more steps whereby value can be imparted to the product because of carbon incentives, climate incentives, or the like that can accrue to the formed product. In example embodiments, such methods can comprise: determining a cost associated with preparing each of a plurality of carbon-modified products, each carbon-modified product being prepared by a method that includes carrying out one or more production steps effective to impart an economic benefit related to one or both of a carbon incentive and a climate incentive; determining the value of the economic benefit associated with each carbon-modified product; determining, for each carbon-modified product, a net benefit as a difference between a value of the economic benefit associated with each of the plurality of carbon-modified products and a cost associated with preparing each of the plurality of carbon-modified products; and forming one or more of the plurality of carbon-modified products such that the net benefit has a positive value. In further embodiments, such methods can be further defined in relation to one or more of the following statements, which can be combined in any number and order.

Determining the cost associated with preparing each of the plurality of carbon-modified products can comprise determining, for each of the plurality of carbon-modified products, a cost associated with removing carbon dioxide from a starting carbonate compound to synthesize an oxide compound.

Determining the cost associated with preparing each of the plurality of carbon-modified products can comprise determining, for each of the plurality of carbon-modified products, a cost associated with combining a synthesized oxide compound with a secondary component to form the intermediate material.

Determining the cost associated with preparing each of the plurality of carbon-modified products further can comprise determining, for each of the plurality of carbon-modified products, a cost associated with adding carbon dioxide to the intermediate material such that at least a majority of the carbon dioxide that is added to the intermediate material is combined with the intermediate material.

Determining the cost associated with preparing each of the plurality of carbon-modified products can comprise determining, for each of the plurality of carbon-modified products, a cost associated with adding carbon dioxide to a synthesized oxide compound that is at least partially in solid form such that at least a majority of the carbon dioxide reacts with the synthesized oxide compound to form a synthesized carbonate compound that is at least partially in solid form.

Determining the cost associated with preparing each of the plurality of carbon-modified products further can comprise determining, for each of the plurality of carbon-modified products, a cost associated with combining the synthesized carbonate compound with a secondary component to form the carbon-modified product Determining the value of the economic benefit associated with each carbon-modified product can comprise determining at least a portion of a carbon-dioxide sequestration credit for and associated with each product, the carbon dioxide sequestration credit being redeemable based on one or both of construction of and financing of an entity incorporating the product.

Determining the value of the economic benefit associated with each carbon-modified product can comprise determining a value of one or more of a tax credit, a tax inapplicability, a tradable value, a transferrable value, a carbon standard, a climate standard, a carbon benefit designation, a climate benefit designation, a carbon benefit certification, and a climate benefit certification.

In some embodiments, methods for preparing a product according to the present disclosure can be configured such that product value is increased beyond what would otherwise be recognized as a suitable market value, such increase being attributable to one or more production steps that directly or indirectly leads to a carbon incentive, climate incentive, or similar tangible or intangible item of value. In an example embodiment, such methods for preparing a product can comprise forming a product by carrying out one or more production steps effective to impart an economic benefit related to one or both of a carbon incentive and a climate incentive so that the product so-produced has a value that is greater than the cost of production, such value being at least partially attributable to one or both of the carbon incentive and the climate incentive. In other embodiments, the methods may be characterized in relation to one or more of the following statements, which can be combined in any number and order.

The one or more production steps effective to impart an economic benefit related to one or both of a carbon incentive and a climate incentive can include combining a synthesized oxide compound with a secondary component to form an intermediate material.

The one or more production steps effective to impart an economic benefit related to one or both of a carbon incentive and a climate incentive further can include adding carbon dioxide to the intermediate material such that at least a majority of the carbon dioxide that is added to the intermediate material is combined with the intermediate material to form a carbon-modified product.

The one or more production steps effective to impart an economic benefit related to one or both of a carbon incentive and a climate incentive can include adding carbon dioxide to a synthesized oxide compound that is at least partially in solid form such that at least a majority of the carbon dioxide reacts with the synthesized oxide compound to form a synthesized carbonate compound that is at least partially in solid form.

The one or more production steps effective to impart an economic benefit related to one or both of a carbon incentive and a climate incentive includes further can include combining the synthesized carbonate compound with a secondary component to form a carbon-modified product.

The one or more production steps effective to impart an economic benefit related to one or both of a carbon incentive and a climate incentive can include utilizing one or both of heat and power that is transferred from a further process that captures carbon.

The economic benefit related to one or both of a carbon incentive and a climate incentive can include one or more of a tax credit, a tax inapplicability, a tradable value, a transferrable value, a carbon standard, a climate standard, a carbon benefit designation, a climate benefit designation, a carbon benefit certification, and a climate benefit certification.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

DETAILED DESCRIPTION OF THE DISCLOSURE

Figure 1:
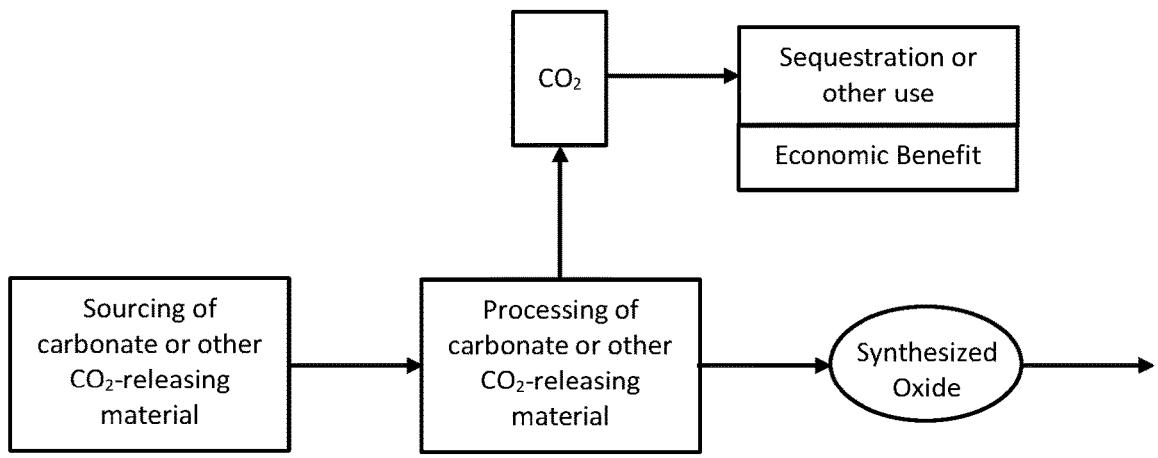
FIG. 1 is a flow chart showing process steps in forming a synthesized oxide according to embodiments of the present disclosure.

The present disclosure relates to methods and products related to carbon capture and/or sequestration. Further, the present disclosure relates to carbon-modified products that have an economic benefit associated therewith. Still further, the present disclosure relates to methods for optimizing production of such carbon-modified products by determining the value of such economic benefits and the costs associated with preparing the carbon-modified products so that a positive net benefit may be realized. Such determinations can be made in light of the ability to transfer associated economic benefits in exchange for the value that is connected to the carbon-modified products. Such value can be calculated based on known incentives, credits, or other value considerations that are otherwise described herein that may be transferred along with a sale of the carbon-modified products (e.g., to a buyer and/or builder and/or financer of a project utilizing the carbon-modified products).

In some embodiments, the present disclosure relates to products that have an economic benefit associated therewith. The economic benefit may arise, at least in part, from the method or process by which the product is formed, prepared, or otherwise made into the form in which it is salable. The economic benefit in particular can arise at least partially because of carbon capture and/or sequestration that occurs in the method or process by which the product is formed and/or that occurs in a related process that is utilized to provide heat and/or power directly to the production method. As such, a product having an economic benefit associated therewith may be characterized as being a carbon-modified product or a carbon-reduced product, and it is understood that these terms can be used interchangeably herein. Likewise, a carbon-modified product can include any product that is known for use or usable for being incorporated into a physical construct, such as buildings, bridges, roads, tunnels, dams, transportation components, and the like. Non-limiting examples of products that are suitable for use in forming such physical constructions, and thus may be included as a product with an economic benefit associated therewith (i.e., a carbon-modified product) include cement products, concrete products, steel products, asphalt products, plastic products, and the like. A carbon-modified product thus may encompass any product that has been prepared such that carbon dioxide has been intentionally added (chemically and/or physically) to the product so that the intentionally added carbon dioxide is effectively sequestered within the product. As further described below, the effective sequestration of carbon dioxide through addition to the product can add value to the product in light of one or more economic benefits that can be triggered or otherwise brought into existence in association with carbon capture and/or sequestration. As such, the economic benefit that is associated with the formed product can be an added value that exceeds the production costs that may otherwise be recouped through sale of the formed product.

An economic benefit associated with a product as described herein can include any value that may be allotted to a product arising from the capture and/or sequestration of carbon, carbon oxides, and specifically carbon dioxide, in formation of the product. Such economic benefit thus may be a value that would not otherwise be allotted to the same product in the ordinary course of commerce if prepared in a manner that did not capture and/or sequester carbon, specifically carbon dioxide, or in a manner that resulted in the capture and/or sequestration of carbon, specifically carbon dioxide.

Economic benefit(s) thus can be associated with a product due to carbon capture and/or sequestration that can be tied to the product itself and thus can transfer with the product. The economic benefit can be anything that imparts added value to the product and can be redeemable through a public or private entity. Economic benefit likewise can be a value that is not directly redeemable from a specific agency but rather is an intangible addition to value, such as goodwill and indications of good stewardship that may cause a down-line purchaser to pay more for the product than would otherwise be accorded in the absence of the associated capture and/or sequestration of carbon as described herein. Because carbon capture and/or sequestration is strongly tied to climate concerns, it is understood that economic benefits described herein as being associated to carbon capture and/or sequestration are fully intended to include benefits that are carbon-driven and/or climate-driven. A benefit that is carbon-driven can be understood to be an economic benefit that is directly or indirectly related to and/or attributable to a carbon incentive, which in turn can be anything of value that is provided due to an activity causing or leading to reducing carbon emissions, capturing carbon from the atmosphere, sequestering carbon, or the like, carbon dioxide being an example of such carbon. A benefit that is climate-driven can be understood to be an economic benefit that is directly or indirectly related to and/or attributable to a climate incentive, which in turn can be anything of value that is provided due to an activity causing or leading to reducing or reversing environmental harm that can contribute to climate change. It is likewise understood that, since carbon emissions are closely tied to climate concerns, reference to reducing carbon, a carbon incentive, or something that is carbon-driven likewise can reference reducing climate concerns, a climate incentive, or something that is climate-driven. For example, a climate credit or climate incentive would be included along with a carbon credit or carbon incentive, and the nomenclature utilized by an agency in naming an economic benefit should not be considered as differentiating from the present disclosure in any instance with the economic benefit can be directly tied to a product that is formed in a manner that is made carbon-reduced, carbon neutral, or carbon negative due to the incorporation of carbon dioxide into a product or an intermediate material that is ultimately used to form the final product. The term "economic benefit" thus is meant to encompass any value that is added to a product arising from the carbon-modification that results in carbon being captured and/or sequestered in formation of the product, regardless of the underlying motivation for the added value.

The present disclosure therefore provides products and methods for preparation thereof wherein the products, because of the physical and/or chemical incorporation of anthropogenic and/or atmospheric carbon dioxide therein (or thereby avoided in the production thereof), are effective to substantially sequester the added carbon dioxide in products formed from the materials and are thus accorded various economic benefits that can add value thereto. In example embodiments, an economic benefit can include a tax benefit or benefits, such as one or more federal, state, and/or local government tax credits and/or write-offs. For instance, tax credits under Section 45Q of the United States Internal Revenue Code (26 U.S.C. § 45Q) can be included. Likewise, the avoidance of a tax that would otherwise be imposed by one or more governmental authorities can be included. For instance, this can include avoidance of a carbon tax. In further example embodiments, such economic benefit can include the creation of value through private, semi-private, governmental, or supranational institutions. Such creation of value can take on many forms that are encompassed by the present disclosure. For instance, this can include tradable or transferrable value similar to renewable energy credits or informal or formal "cap-and-trade" implementation. This further can include so-called "Low Carbon Fuel Standards" or similar standards, whether or not related to fuel. Still further, this can include characterization of a product or a unit of power with a designation that directly or indirectly implies that the product or unit of power is environmentally friendly, climate friendly, or otherwise recognized as being desirable and thus appropriate for being accorded an increased value. This can include designations, such as being "green," "blue," "clean," "climate friendly," "ESG-compliant" (i.e., compliant with one or more environmental, social, and governance standards), or otherwise being desirable for reasons associated with having a reduced carbon footprint or reduced climate impact.

Economic benefits that can be associated with a product according to the present disclosure can vary based upon the specific benefit that is accorded to the product. The present disclosure thus also provides for optimization of the production of products that can be effective to encourage preferred purchasing of the carbon-modified products because the economic benefit associated with the product can at least partially off-set the cost of making and/or purchasing such products. Through such optimization, certain products can thus be economically and/or environmentally preferred over other products. This can be, for example, because the economic benefits can be transferred along with the sale, trade, or other disposition of the products as described herein, and such economic benefits can inure to the benefit of (e.g., be redeemed by) one or more recipients of the products. This can include one or more of a purchaser of the product(s), a builder of a project utilizing the product(s), and/or a financer of a project utilizing the product(s). Because of the transfer of the economic benefit with the associated product(s), the recipient of the product(s) (or a builder, financer, etc.) can at least partially redeem or otherwise receive the economic benefit. For example, in the case of a tax benefit associated with carbon sequestration, by removing carbon dioxide from an anthropogenic and/or atmospheric source and incorporating the carbon dioxide into the product (or an intermediate material used to form the product), the removed carbon dioxide becomes effectively sequestered in the product, and this activity may qualify for a concomitant economic benefit (such as a carbon sequestration credit). When the product is permanently incorporated into a project, such activity may alternatively or additionally qualify for the concomitant economic benefit (such as a carbon sequestration credit). Likewise, financing of a project into which such product with sequestered carbon is provided may alternatively or additionally qualify for a concomitant economic benefit (such as a carbon sequestration credit). A party that acts as a manufacturer and/or a provider of the product may thus transfer to a third party part or all of the economic benefit associated with the product, such as the example embodiment of a tax credit, or any other tangible or intangible value.

Products according to the present disclosure can have an associated economic benefit because the products can be substantially lower carbon to carbon neutral or carbon negative. This can be achieved directly, such as by forming the products so as to add carbon dioxide from an anthropogenic and/or atmospheric source even if the underlying components used in preparing the product are not carbon-neutral. Alternatively, or additionally, this can be achieved through providing heat and/or power that is needed to prepare the products from one or more processes that capture carbon. For example, U.S. Pat. No. 8,596,075 to Allam et al., U.S. Pat. No. 9,546,814 to Allam et al., U.S. Pat. No. 8,776,532 to Allam et al., U.S. Pat. No. 9,850,815 to Allam et al., and U.S. Pat. No. 10,422,252 to Allam et al., all disclose systems and methods suitable for production of heat and power with simultaneous carbon capture, and the disclosures of such documents are hereby incorporated herein by reference. Preferably, the products described herein can be carbon negative in that they remove more carbon from the atmosphere than is utilized in forming the products. This can be achieved particularly by forming the products using synthesized compounds (e.g., synthesized oxide compounds and/or synthesized carbonate compounds) that have been synthesized in a manner whereby formed carbon dioxide is sequestered or otherwise used and not substantially emitted to the atmosphere.

Methods for preparing a product according to the present disclosure thus can utilize a synthesized oxide compound in one or more of the process steps. The synthesized oxide compound may be reacted with another material to form an intermediate or to form the final product.

For example, in some embodiments, a method for preparing a product can comprise combining a synthesized oxide compound with a secondary component to form an intermediate material. Non-limiting examples of secondary components that may be used in this manner can include silicates, aluminas, oxides, water, cellulose-based components, lignin-based components, hemicellulose-based components, and similar components. The intermediate material this is formed by the combination of the synthesized oxide compound with the secondary component can be in a form that is suitable for combination with carbon dioxide to effectively capture and/or sequester at least a portion of the carbon dioxide. Preferably, at least a majority (i.e., greater than 50% by weight) of the carbon dioxide that is added to the intermediate material will be combined with the intermediate material to form a product, and more particularly a carbon-modified product that has an economic benefit associate therewith, as already described above. In other cases, however, such as removing carbon dioxide from the atmosphere, a lesser portion of the total carbon dioxide will be capable of being so added to the intermediate material.

Adding of the carbon dioxide to the intermediated material can encompass chemical reacting of the carbon dioxide with the intermediate material and/or physical inclusion of the carbon dioxide into the intermediate material. Preferably, the carbon dioxide is thusly combined with the intermediate material such that the thus-formed product will retain the carbon dioxide for an extended period of time. The so-formed product, for example, may retain at least 50%, at least 75%, at least 85%, at least 90%, at least 95%, at least 96%, at least 97%, at least 98%, at least 99%, or at least 99.5% by weight of the carbon dioxide that is added to the intermediate material for at least a minimum length of time. For example, the minimum length of time can be at least one week, at least one month, at least six months, at least one year, at least a decade, at least a century, at least a millennium, or an even greater length of time, including substantially indefinitely. Preferably, a defined amount of the carbon dioxide within one of the ranges noted above will be retained substantially indefinitely under typical atmospheric or geologic conditions (e.g., within typical temperature and pressure ranges), and exhibiting a retaining capacity for a time as noted above may be representative of the ability of the product to retain the carbon dioxide substantially indefinitely.

In further embodiments, a method for preparing a product can comprise adding carbon dioxide to a synthesized oxide compound such that at least part of the carbon dioxide reacts with the synthesized oxide compound to form a synthesized carbonate compound. More particularly, the synthesized oxide compound can be at least partially in solid form or may be substantially completely in solid form (e.g., at least 95%, at least 97%, or at least 99% by weight of the synthesized oxide compound is in solid form). Preferably at least a majority (i.e., greater than 50% by weight) of the carbon dioxide that is added to the synthesized oxide compound will react therewith to form the synthesized carbonate compound. Again, however, dilute concentrations of carbon dioxide in, for instance, the atmosphere will also be effective due to the sheer volume of air that can be driven through the process.

The synthesized carbonate compound that is prepared as noted above can be combined with a secondary component to form a product, and more particularly a carbon-modified product that has an economic benefit associate therewith, as already described above. Non-limiting examples of secondary components that may be used in this manner again can include silicates, aluminas, oxides, water, cellulose-based components, lignin-based components, hemicellulose-based components, and similar components.

The synthesized oxide compound that is utilized in preparing an end product can take on a variety of forms. Oxide compounds can be particularly useful because of the ability to readily transform to and from such compounds through the addition or removal of carbon dioxide. As a non-limiting example, calcium carbonate ($CaCO_3$) can be converted to calcium oxide (CaO) and carbon dioxide ($CO_2$) through addition of heat. Moreover, oxide compounds can form the basis for polymers that result in a number of materials, including, for instance, materials commonly referred to as plastics. Likewise, calcium oxide can be reacted with carbon dioxide to synthesize calcium carbonate. Beneficially, many materials like calcium carbonate can exist in a natural form (e.g., limestone), and the carbon dioxide that is formed in converting the natural form to a useable and reactive oxide can be captured. Any carbonate compound that can be processed to release carbon dioxide and form a resulting, lower oxide compound may be utilized as a starting material. Likewise, any other material that may be sourced, for example, from a geologic formation and/or from a recycled material and that is capable of releasing carbon dioxide in processing thereof may be utilized herein. Thus, at least a portion of the carbon dioxide that is removed from a starting carbonate compound or similar material can be carbon-captured in the manufacturing process, and the carbon dioxide can be sequestered in a separate process or can be at least partially retained for further reaction as otherwise described herein. Further, the lower oxide can then react with carbon dioxide from other sources, such as flue gas or the atmosphere, to produce a carbonate that, in turn, can be heated to release the carbon dioxide for sequestration or use.

A synthesized oxide compound as used in the present disclosure is thus different from a naturally occurring product in that the oxide has been synthetically formed. Preferably, the synthesized oxide is a compound that has been synthetically formed in a manner that is lower carbon, carbon neutral, or carbon negative in that no carbon dioxide is released in the synthesis process or that carbon dioxide is actually removed from the atmosphere as a result of the synthesis process. This can occur through making the oxide from its constituent components in a synthesis reaction or by isolating the oxide from a more complex constituent, such as converting limestone to calcium oxide, as noted above. In one or more embodiments, a synthesized oxide thus can encompass a wide range of suitable materials. In some embodiments, a useful synthesized oxide compound can be an alkali oxide, such as an oxide of a Group I metal (e.g., lithium, sodium, potassium, etc.). In some embodiments, a useful synthesized oxide compound can be an alkaline oxide, such as an oxide of a Group II metal (e.g., calcium, magnesium, etc.). In some embodiments, a useful synthesized oxide compound can be a transition metal oxide, such as an oxide of any commonly available transition metal (e.g., titanium, vanadium, chromium, manganese, iron, cobalt, nickel, copper, zinc, etc.). In some embodiments, a useful synthesized oxide compound can be a crystallogen oxide, such as an oxide of a Group IV periodic table element (e.g., carbon, silicon, germanium, tin, and lead).

The present disclosure may be characterized in relation to a number of processing steps that may be combined in a variety of manners. It is thus understood that less than all of the exemplified processing steps may be carried out to provide different types of products that can have an economic benefit associated therewith in light of the carbon handling that is carried out in the formation of the product. Moreover, it is expressly intended that the processing steps described herein may be combined in any fashion suitable to form a product in a manner that is carbon neutral, or preferably carbon negative, such that the formed product has an economic benefit associated therewith that can be transferred along with the product.

FIG. 1 illustrates a process whereby a synthesized oxide can be formed, and carbon dioxide that is released in the process is captured for sequestration or other use such that an economic benefit accrues. More particularly, in FIG. 1, a carbonate or other CO2-releasing material may be sourced, such as from a geologic source and/or from recycled materials. As a non-limiting example, the carbonates may include calcium carbonates, such as limestone. The carbonate or other material may be processed to synthesize one or more oxides with the evolution of carbon dioxide. For example, calcium carbonate may be used to synthesize calcium oxide. The formed carbon dioxide is preferably utilized in enhanced recovery of carbonaceous deposits, such as oil through enhanced oil recovery (EOR), gas through enhanced gas recovery (EGR), or coal bed methane recovery (ECMBR), injected for sequestration, or otherwise captured. As such, at least a portion of the carbon dioxide that is removed from a starting compound, such as a carbonate, is carbon captured. The process illustrated in FIG. 1 need not necessarily require that the sourcing and the processing be carried out together. For example, a processor of the carbonate or other material may process the material to form the synthesized oxide and may source the carbonate or other material from a third party. Likewise, the formed carbon dioxide may be sold to a third party for sequestration and/or other use such that the third party receives the economic benefit associated with the sequestration or other use, such as, for example, an associated carbon sequestration tax credit.

Figure 2:
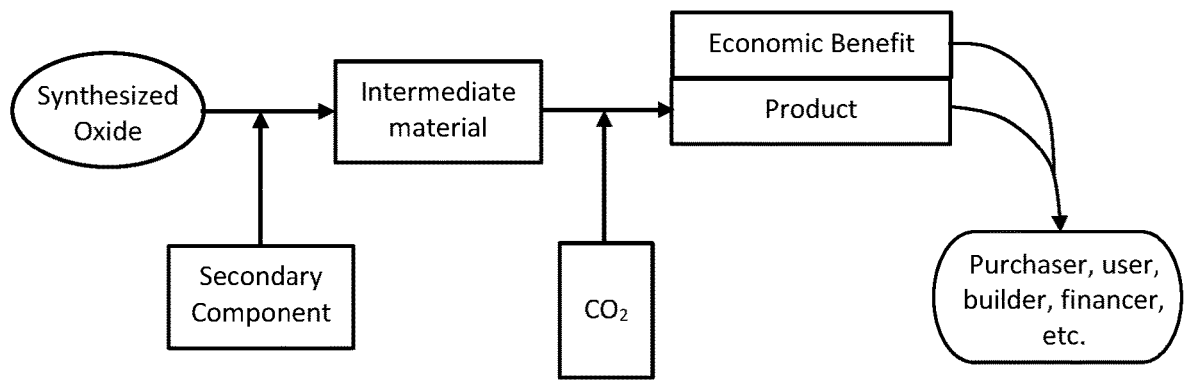
FIG. 2 is a flow chart showing process steps in forming a product with an associated economic benefit according to embodiments of the present disclosure.

FIG. 2 illustrates a process wherein the synthesized oxide that is prepared according to the process of FIG. 1 may be utilized to prepare other products that have an economic benefit associated therewith. It is understood that the process of FIG. 1 may be carried out sequentially with the process of FIG. 2; however, the process of FIG. 2 may be carried out independent of the process of FIG. 1, and the synthesized oxide utilized in the process of FIG. 2 may be sourced from another party carrying out part or all of the process of FIG. 1.

As illustrated in FIG. 2, a synthesized oxide compound (which may come directly from the process of FIG. 1 or from an alternative source that preferably synthesizes the oxide in a process that is carbon neutral or carbon negative) is combined with a secondary component to form an intermediate material. The combining of the synthesized oxide compound with the secondary material may encompass one or both of a physical combination and a chemical reaction such that the synthesized oxide compound is physically and/or chemically combined with or added into the secondary component. Non-limiting examples of the secondary component include silicates, aluminas, oxides, water, cellulose-based materials, lignin-based materials, hemicellulose-based materials, and similar materials that are suitable for converting an oxide, such as calcium oxide, into a suitable material as otherwise described herein. The intermediate material can be further processed to effectively capture and/or sequester added carbon dioxide. This can encompass adding carbon to the intermediate material such that at least a portion, and preferably at least a majority, of the carbon dioxide that is added to the intermediate material is combined with the intermediate material. In particular, at least 50%, at least 75%, at least 85%, at least 90%, at least 95%, at least 97%, at least 98%, at least 99%, or at least 99.5% by weight of the added carbon dioxide may be added to the intermediate material. The carbon dioxide can be from an anthropogenic or atmospheric carbon dioxide source, and the carbon dioxide may particularly be taken as an exhaust from a further process that would otherwise be adding carbon dioxide to the atmosphere. The adding of the carbon dioxide can be such that the carbon dioxide is one or both of physically and chemically combined with the intermediate material. In light of the addition of the carbon dioxide to the intermediate material, the thus-formed product may be characterized as a carbon-modified product, and the formed product thus can have an economic benefit associated therewith, as otherwise discussed above. The product formed in FIG. 2 with the associated economic benefits may be sold/transferred as desired for use in forming further products/projects/components as desired, and the economic benefit may be sold/transferred along with the product to one or more third parties.

The secondary material with which the synthesized oxide is combined can be provided in a variety of forms. In some embodiments, the secondary material may be provided as a powder, pellets, granules, fibers, or the like and may be added to a stream of the synthesized oxide. Alternatively, the secondary material may be provided in a batch form or in an even larger configuration, and the synthesized oxide may be added continuously, or in a batch mode, to the secondary component. An example embodiment of such process is when the secondary component is water, which may be fresh water, salt water, a formed brine mixture, or any combination thereof. The synthesized oxide then may be added to the water, and active or passive aeration may be carried out (e.g., mechanical mixing may be applied for aeration, or aeration may occur passively because of natural currents, wind action, or the like in a natural or anthropogenic body of water). The oxide and water mixture can effective form a pH buffered solution favoring the absorption of carbon dioxide from the aeration activity. As non-limiting examples, synthesized calcium oxide may be added to a body of water (e.g., an ocean or other salt water body) to increase carbon dioxide absorption. Similarly, calcium oxide or other oxides may be added to disposal water bodies, such as water bodies created in petroleum exploration and production and/or bodies of water created from desalination facilities. Addition of oxides to water bodies likewise can be utilized as a component of remineralization, such as liming of reverse osmosis (RO) water bodies.

Figure 3:
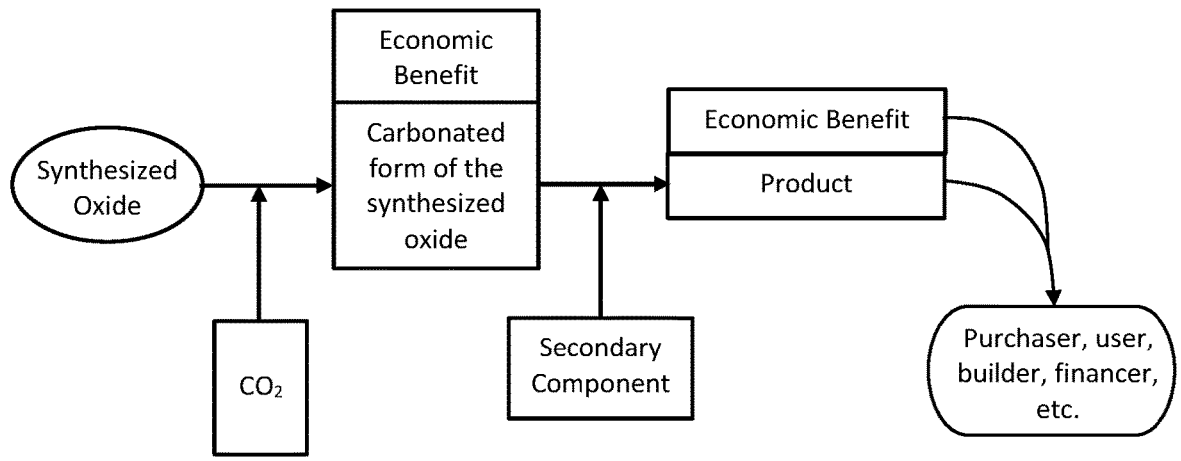
FIG. 3 is a flow chart showing process steps in forming a product with an associated economic benefit according to further embodiments of the present disclosure.

FIG. 3 illustrates a further method for preparing a product according to the present disclosure. In one or more embodiments, a synthesized oxide compound (which may come directly from the process of FIG. 1 or from an alternative source that preferably synthesizes the oxide in a process that is carbon neutral or carbon negative) is processed by adding carbon dioxide. The synthesized oxide compound in such embodiments is preferably at least partially in solid form (e.g., at least 50%, at least 75%, at least 90%, at least 95%, at least 98%, or at least 99% by weight solid). The carbon dioxide can be added to the synthesized oxide such that at least a portion, and preferably at least a majority, of the carbon dioxide reacts with the synthesized oxide compound to form a synthesized carbonate compound that is at least partially in solid form (e.g., having a solids percentage in a range as noted above for the synthesized oxide). The so-formed carbonate compound, for example, may be substantially entirely in a solid form, may be at least partially in a solid form that is at least partially dissolved in a solution, may be a solid that present as a suspension in a liquid medium, or may be a solid that is dispersed in a colloidal form.

In particular embodiments, at least 50%, at least 75%, at least 85%, at least 90%, at least 95%, at least 97%, at least 98%, at least 99%, or at least 99.5% by weight of the added carbon dioxide may be added to the synthesized oxide to form the carbonated form of the oxide. In one or more embodiments, such addition of carbon dioxide may be such that the synthesized oxide is chemically reacted with the carbon dioxide to form the carbonated material. The thus formed carbonate effectively sequesters the carbon dioxide that is added to the synthesized oxide. The carbonated material may be characterized as being a synthesized carbonate in that it was formed through a synthesis reaction and is thus differentiated from a naturally occurring carbonate, such as limestone.

As illustrated in FIG. 3, the formed carbonate can have an economic benefit associated therewith in light of the addition of the carbon dioxide thereto. Accordingly, in some embodiments, at least a portion of the formed carbonate material may be considered to be a carbon-modified product that has an economic benefit associated therewith. For example, a portion of the carbonate may be sold or transferred along with the associated economic benefit. All or a portion of the carbonate, however, may be further processed as illustrated in FIG. 3. Particularly, the synthesized carbonate compound can be combined with a secondary component to form a carbon-modified product that has an economic benefit associated therewith. The secondary component again may be a material as already described above. In light of the addition of the carbon dioxide in preparing the intermediate carbonate, the end product may be characterized as a carbon-modified product, and the formed product thus can have an economic benefit associated therewith, as otherwise discussed above. The product formed in FIG. 3 with the associated economic benefits may be sold/transferred as desired for use in forming further products/projects/components as desired, and the economic benefit may be sold/transferred along with the product to one or more third parties.

Figure 4:
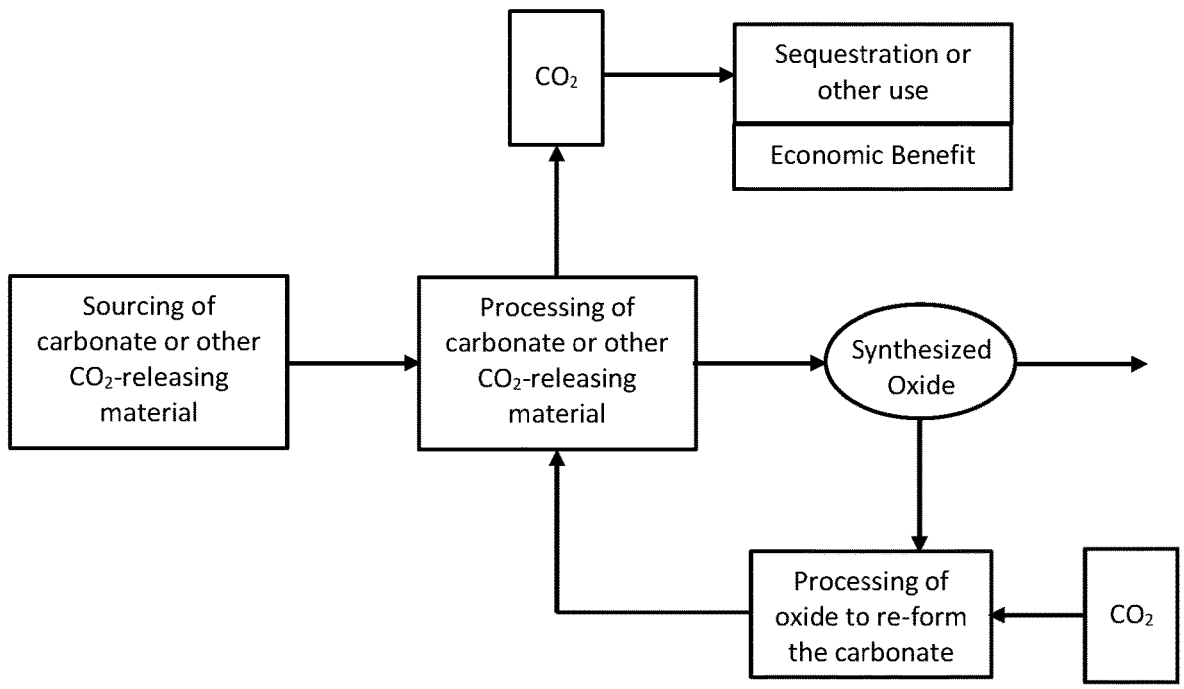
FIG. 4 is a flow chart showing process steps in forming a synthesized oxide with associated calcium looping according to embodiments of the present disclosure.

In one or more embodiments, the process of forming the synthesized oxide can be modified from what is illustrated in FIG. 1 in order to increase the amount of carbon dioxide that can be captured and/or sequestered. For example, as seen in FIG. 4, the process of forming the synthesized oxide can be modified to include calcium looping or similar processes. In calcium looping, a portion of the synthesized oxide that is produced as discussed in relation to FIG. 1 can be re-combined with additional carbon dioxide to re-form the carbonate compound. The carbon dioxide that is added to the synthesized oxide can be anthropogenic or atmospheric, and this can be combined with any process that provides carbon dioxide as an end product. The carbon dioxide can be captured through reaction with the synthesized oxide to form the carbonate. The thus-formed carbonate can then be processed (e.g., by heating) to drive off the carbon dioxide in a controlled manner, and the released carbon dioxide can be delivered for sequestration or other use and, as noted previously, this can include an added economic benefit. As shown in FIG. 4, the re-formed carbonate is added to the processing of the source carbonate, but it is understood that the re-formed carbonate may be processed separate from the source carbonate to form a separate stream of carbon dioxide that can be delivered for sequestration or other use.

A product that is formed as otherwise described above through modification to incorporate carbon dioxide and through combination with a secondary component (in any order) can encompass a beneficially large number of products, and such products can vary based upon the exact chemical nature of the synthesized oxide as well as the nature of the secondary component. The formed products particularly can be beneficial as construction materials for a wide variety of projects, large and small, and thus may be characterized as being useful as infrastructure materials. The products, however, may also be useful in forming consumer products or other similar products. Preferably, the products can be used in projects configured for a significantly long lifetime, such as buildings, roads, bridges, and the like, or in products with a significantly long useful life, such as equipment incorporating products commonly referred to as plastics and carbon nanomaterial. Non-limiting examples of products that may be formed as described herein include cement products, concrete products, steel products, asphalt products, and plastic products. For example, silicates, aluminas, and oxides are commonly used in the formation of cement and concrete products, and such materials may also be used in the formation of steel products and asphalt products. Cellulose-based materials, lignin-based materials, and hemicellulose-based materials can be used as additives in a wide variety of products including, but not limited to, plastic and carbon nanomaterial products.

As can be seen from the foregoing, the present disclosure provides a variety of processes and methods suitable for forming products such that the products incorporate and thus sequester carbon dioxide or such that the processes and methods use heat and/or power from sources that capture carbon. Accordingly, these processes and methods can be effective for forming the products in a manner that can cause one or more economic benefits to accrue and thus be associated with, and transferable with, the product. This benefit arises in some embodiments from the modification of at least one oxide compound with a secondary component to form a product, and the incorporation of carbon dioxide into the product such that the product can be characterized as being carbon-modified and/or as having an economic benefit associated therewith. In further embodiments, this benefit can arise from the reaction of at least one oxide compound with carbon dioxide to form an intermediate carbonate compound that can be combined with a secondary component to form the final product having the economic benefit associated therewith. Moreover, the formed products can further be beneficial in that the starting oxide material itself may be a synthesized oxide compound that has been synthesized in a manner whereby evolved carbon dioxide is captured and/or sequestered. In even further embodiments, this benefit can arise from the creation of products using heat and/or power from other carbon-capturing systems and methods. Because of the carbon dioxide management and sequestration in preparation of the described products, the formed products can have an associated economic benefit that may be transferred to one or more third parties. In this manner, the use of specific products may be incentivized through the ability of a purchaser of the product, a developer building a project utilizing the product, a financer of a project utilizing the product, or the like to redeem or otherwise accrue value from the economic benefit that is transferred with the product. Because carbon dioxide is effectively removed from the atmosphere or prevented from being released to the atmosphere in forming products as described above, and because the so-formed products are incorporated into a larger project or equipment, the carbon dioxide sequestered therein may be stored in a manner such that the project or equipment qualifies for redemption or other value arising from the economic benefit associated with the product.

Due to the economic benefit that is associated with a product through the methods of preparation described herein, it can likewise be beneficial to additionally carry out a determination of a net benefit that is associated with such product. For example, this can include determining a difference between a value of the economic benefit associated with a carbon-modified product and a cost associated with preparing the carbon-modified product. This particularly may be evaluated on a per-unit basis as further described herein.

Figure 5:
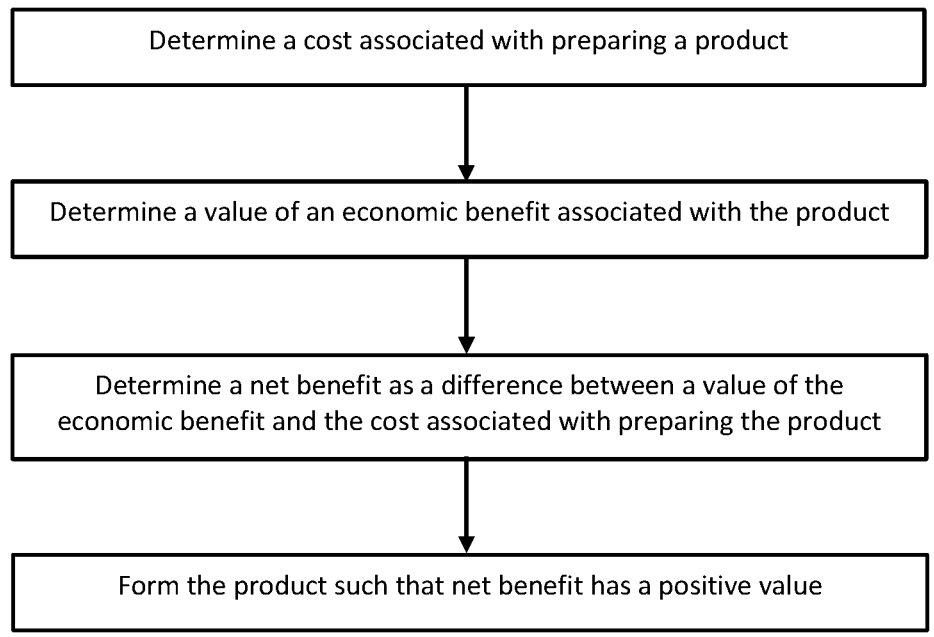
FIG. 5 is a flow chart showing process steps in optimizing production of products toward a net positive value according to embodiments of the present disclosure.

In one or more embodiments, the present disclosure can relate to methods for optimizing production of one or more products. Such methods can be particularly useful for evaluating the value of an economic benefit associated with a product that has been prepared by one or more processes wherein carbon dioxide is captured and/or sequestered so that the product is effectively a carbon-modified product. The present methods can be carried out in combination with a method of preparing a product as described above, or the present methods can be carried out separate from the production processes described above in order to evaluate options for adding value to an existing process. An example embodiment of a method for optimizing production of one or more products is shown in FIG. 5. As seen therein, the method can include the step of determining a cost associated with preparing each of a plurality of products (e.g., carbon-modified products as defined herein). This can include summing the total costs associated with preparing a batch of products (e.g., cost of raw materials, labor costs, transportation costs, operational expenses, etc.) and dividing by the number of product units prepared in the batch or utilizing any further algorithms or computer programs configured for converting production costs to a per-unit basis. The method can further include the step of determining the value of an economic benefit associated with each product. As already discussed above, this can vary based upon the product being formed and the type of economic benefit that is accorded. For example, the currency value of a tax credit can be directly used in this calculation. Alternatively, the added value to a product arising from popular conceptions of environmental friendliness can be calculated based upon prevailing market data or other suitable methods. In this manner, an actual or theoretical value can be established on a per-unit basis. Still further, the method can include the step of determining, for each carbon-modified product, a net benefit as a difference between the value of the economic benefit associated with each of the plurality of carbon-modified products and a cost associated with preparing each of the plurality of carbon-modified products. This will then provide necessary data for use in calculating the economic feasibility of producing carbon-modified products. For example, for certain products and/or certain end uses, the cost of forming a product in a manner that is reduced carbon, carbon neutral, or carbon negative may exceed the realizable return upon sale of the product when considering the added economic benefit that is associated with the carbon-modified or carbon-reduced (e.g., directly or indirectly, as already noted above) product. For example, if the additional cost of preparing a product so that it is carbon-modified (versus the cost of preparing the product so that it is not carbon-modified) is greater than the economic benefit that may be accrued to the product due to being carbon-modified or carbon-reduced, then production of the process may not be considered to be optimized. On the other hand, if the economic benefit that may be accrued to the product due to being carbon-modified or carbon-reduced exceeds the additional cost of preparing the product (versus the cost of preparing the product so that it is not carbon-modified), then proceeding with such production may be considered to be optimized. In some embodiments, the present method may initially indicate a negative value, but further considerations may be undertaken, and the process for preparing the carbon-modified product may be altered such that a positive value may be obtained. Accordingly, the method can further comprise carrying out the actual steps of forming one or more of the plurality of carbon-modified and carbon-reduced products such that the net benefit has a positive value.

Various further considerations may be included in carrying out the present method. For example, determining the cost associated with preparing a carbon-modified or carbon-reduced product can include determining a cost associated with removing carbon dioxide from a starting carbonate compound to form the synthesized oxide compound. Referring to FIG. 1, this can include determining the cost on a per-unit basis for processing of the carbonate or other $CO_2$-releasing material to remove carbon dioxide therefrom. Such cost may be reduced by the economic benefit that is accrued through sequestration or other use of the formed carbon dioxide. Alternatively, such economic benefit from sequestration or other use may be added to the economic benefit that is associated with the end product (e.g., the product in FIG. 2 or FIG. 3). In another example, the cost production of any material can be reduced on a per-unit basis because the cost of the heat and/or power used to produce such material was reduced because of the economic benefit of producing such heat and/or power through a process that captured carbon.

In some embodiments, determining the cost associated with preparing a carbon-modified product can include determining a cost associated with combining the synthesized oxide compound with the secondary component to form the intermediate material. Referring to FIG. 2, this can include evaluating all costs associated with procuring the secondary component, operational costs in carrying out the combination of the oxide with the secondary component, and the like. Likewise referring to FIG. 2, determining the cost associated with preparing a carbon-modified or carbon-reduced product can also include determining a cost associated with adding carbon dioxide to the intermediate material such that the carbon dioxide that is added to the intermediate material is combined with the intermediate material.

In some embodiments, determining the cost associated with preparing a carbon-modified or carbon-reduced product can include determining a cost associated with adding carbon dioxide to the synthesized oxide compound such that the carbon dioxide reacts with the synthesized oxide compound to form a synthesized carbonate compound. Referring to FIG. 3, this can include carbon dioxide procurement costs (which may be zero or even negative, depending upon the source) and operational costs associated with the carbonation reaction that may be carried out. Because the formed carbonate may have an associated economic benefit, the costs associated with preparing the carbonate may be at least partially off-set by the economic benefit. Alternatively, that economic benefit may be retained to be associated partially or fully with the end product. Still referencing FIG. 3, determining the cost associated preparing a carbon-modified product further can include determining a cost associated with combining the synthesized carbonate compound with the secondary component to form the carbon-modified product.

In further embodiments, various considerations can be taken into account in relation to determining the value of the economic benefit associated with a carbon-modified or carbon-reduced product. In some instances, the value of the economic benefit may be at least partially defined by a statute, ordinance, or the like as instituted by a governmental entity. For example, a tax credit associated with a defined action may be directly relatable to the carbon-modified or carbon-reduced product and be transferred therewith. Thus, in some embodiments, determining the value of the economic benefit associated with a carbon-modified or carbon-reduced product can comprise determining at least a portion of, for instance, a carbon-dioxide sequestration credit for and associated with the product or its production. In the example of such credit, this may also take into consideration whether a certain type of activity is required for redemption of the credit, for example, whether the credit is redeemable based on one or both of construction of, and financing of, an entity incorporating the product. The value of the economic benefit may thus consider one or both of tangible and intangible benefits that may provide monetary value. For example, determining the value of the economic benefit associated with a carbon-modified product can include determining a value of one or more of a tax credit, a tax inapplicability, a tradable value, a transferrable value, a carbon standard, a climate standard, a carbon benefit designation, a climate benefit designation, a carbon benefit certification, and a climate benefit certification.

As can be seen from the foregoing, the present disclosure provides methods whereby products can be prepared in a manner that adds value to the products beyond the market value of such products, and the present disclosure further provides methods for optimizing production of products toward processes that yield a positive net result. The methods for preparing a product can utilize heat and/or power from processes that capture carbon and/or can utilize a synthesized oxide compound and, depending upon the order of combination, can modify the synthesized oxide compound by combination with both of carbon dioxide and a secondary component. In some embodiments, the methods can comprise combining a synthesized oxide compound with a secondary component to form an intermediate material, and adding carbon dioxide to the intermediate material such that at least a portion, and preferably at least a majority, of the carbon dioxide that is added to the intermediate material is combined with the intermediate material to form a carbon-modified product that has an economic benefit associated therewith. In further embodiments, the methods can comprise adding carbon dioxide to a synthesized oxide compound that is at least partially in solid form such that at least a portion, and preferably at least a majority, of the carbon dioxide reacts with the synthesized oxide compound to form a synthesized carbonate compound that is at least partially in solid form, and combining the synthesized carbonate compound with a secondary component to form a carbon-modified product that has an economic benefit associated therewith.

The starting oxide compound can be obtained in a variety of manners. In some embodiments, however, the present methods can expressly include one or more process step for forming the synthesized oxide compound. For example, forming the synthesized oxide compound can comprise removing carbon dioxide from a starting carbonate compound or similar compound that can be processed for removal of carbon dioxide, preferably with at least a portion of the carbon dioxide that is removed from the starting carbonate compound being carbon-captured.

Any suitable processing steps and equipment suitable for processing a carbonate or similar material to form an oxide thereof may be utilized according to the present disclosure. As an example, U.S. patent application Ser. No. 16/864,944, filed May 1, 2020, describes systems and methods whereby carbonates may be converted into oxides with the evolution of carbon dioxide, which carbon dioxide can be fully captured, and the disclosure of said patent application is incorporated herein by reference.

For example, suitable processing can incorporate any one or more of a reactor, heat recuperator, drier/water separator, pressurization component, acid gas separator, and carbon dioxide purifier. More particularly, a raw material may be heated in a reactor in the presence of oxygen to form carbon dioxide. Depending upon the specific mode of operation and the raw material that is utilized, the reactor may be more particularly referred to as a kiln or a calciner. In example embodiments, a reactor may be configured as a calciner for receiving a mineral component (e.g., limestone) and driving off carbon dioxide. Any of a number of configurations may be utilized in relation to the reactor. For example, the reactor may be configured as a vertical kiln, a horizontal kiln, an indirectly heated kiln, or in any other suitable configuration. The reactor may be a stand-alone component or may be a segment or section of a reactor unit. In some embodiments, a reactor may be operated at a relatively low pressure but above ambient. For example, the operational pressure may be up to about 10 bar, up to about 8 bar, up to about 5 bar, or up to about 4 bar, such as in the range of about 1.5 bar to about 8 bar, about 2 bar to about 5 bar, or about 2 bar to about 3 bar. In particular, the operational pressure of a reactor may be any desired value that can reasonably be achieved with a conventional air blower design. The reactor preferably is oxygen enriched in that an oxygen source is provided to the reactor to ensure that desired chemical reactions proceed in the reactor environment. In some embodiments, the reactor can be operated at a pressure that is around 1 bar (e.g., +/−10%).

Pressurization of the reactor can be achieved by an incoming, blown oxidant and/or a gaseous, or vaporized, fuel source to be combusted or oxidized for heat production. The combusted or oxidized fuel source can provide beneficial heating to other components of the system, such as a calcination reactor. The fuel source may be any suitable material. In some embodiments, as noted above, a gaseous fuel may be utilized, and non-limiting examples include natural gas, synthesis gas, sour gas, BOS gas (oxygen steel furnace gas), digester gas, fuel oil, or the like. In some embodiments, a solid fuel may be used (e.g., particularized coal, biomass, lignite, or the like) and, in such embodiments, the oxidant may be the sole source of pressurization for the reactor.

Like the fuel, a variable chemistry may also be utilized in relation to the oxidant source. In some embodiments, substantially pure oxygen may be used (e.g., greater than 95%, greater than 98%, or greater than 99% molar oxygen); however, such purity levels are not required. In some embodiments, the oxidant may comprise a flue gas from an industrial process that may be operated in combination with or separately from the present system.

The reactor may be fired at a temperature that preferably is suitable for carbonate mineral decomposition. For example, firing temperature may be about 850° C. or greater, about 900° C. or greater, about 950° C. or greater, or about 1000° C. or greater (e.g., up to the practical limits of the equipment utilized), such as in a range of about 850° C. to about 1100° C., about 900° C. to about 1100° C., or about 950° C. to about 1100° C.

The reactor may be operated sequentially with a solids separation component which may be integral with the reactor (e.g., positioned at an outlet of the reactor) or may be a component of a reactor unit, or may be a stand-alone component of the overall system. Any suitable separation equipment may be utilized, such as a cyclone separator, a candle filter, and/or any other combination of these technologies and others. The performance of the solids separator should be sufficient that the exiting gas is appropriate for use with a heat recovery device.

Heat recuperation can be desirable. For example, a single heat recuperator (e.g., a recuperative heat exchanger, a heat recovery steam generator (HRSG), a gas heated reformer (GHR), or the like) may be utilized, or a plurality of heat recuperators (e.g., a plurality of any of the aforementioned example embodiments and the like and/or a combination of different types of the aforementioned heat recuperators) may be utilized. Likewise, one or more driers or drying unit which may incorporate components adapted to or configured to remove water or moisture in general from a gas stream may be included. One or more pressurization components or a pressurization unit may also be included and can be particularly useful for facilitating $CO_2$ removal, depending upon the type of separator that is utilized. For example, pressurization can be beneficial upstream of any membrane separation stage and can also allow for refrigeration through downstream expansion of the compressed stream. One or more acid gas separation components can be utilized, such as a $CO_2$ separation membrane component or unit, a water scrubber for removing any residual SOx and NOx that may be present depending upon the composition of the source material. A carbon dioxide purification component or unit may be useful for providing the removed carbon dioxide in a substantially pure form. For example, a cryogenic purifier may be used.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for preparing a product, the method comprising:
combining a synthesized oxide compound with a secondary component to form an intermediate material; and
adding carbon dioxide to the intermediate material such that at least a majority of the carbon dioxide that is added to the intermediate material is combined with the intermediate material to form a carbon-modified product that has an economic benefit associated therewith.

2. The method of claim 1, further comprising forming the synthesized oxide compound.

3. The method of claim 2, wherein forming the synthesized oxide compound comprises removing carbon dioxide from a starting carbonate compound.

4. The method of claim 3, wherein at least a portion of the carbon dioxide that is removed from the starting carbonate compound is carbon-captured.

5. The method of claim 1, wherein the synthesized oxide compound comprises one or more of an alkali oxide compound, an alkaline oxide compound, a transition metal oxide compound and a crystallogen oxide compound.

6. The method of claim 1, wherein the secondary component comprises one or more of a silicate, an alumina, an oxide, water, a cellulose-based component, a lignin-based component, and a hemicellulose-based component.

7. The method of claim 1, wherein the carbon-modified product includes one or more of a concrete product, a steel product, an asphalt product, and a plastic product.

8. The method of claim 1, further comprising determining a net benefit of the carbon-modified product as a difference between a value of the economic benefit associated with the carbon-modified product and a cost associated with preparing the carbon-modified product.

9. A carbon-modified product prepared according to the method of claim 1, the carbon-modified product having the economic benefit associated therewith.

10. A method for preparing a product, the method comprising:
adding carbon dioxide to a synthesized oxide compound that is at least partially in solid form such that at least a majority of the carbon dioxide reacts with the synthesized oxide compound to form a synthesized carbonate compound that is at least partially in solid form; and
combining the synthesized carbonate compound with a secondary component to form a carbon-modified product that has an economic benefit associated therewith.

11. The method of claim 10, further comprising forming the synthesized oxide compound.

12. The method of claim 11, wherein forming the synthesized oxide compound comprises removing carbon dioxide from a starting carbonate compound.

13. The method of claim 12, wherein at least a portion of the carbon dioxide that is removed from the starting carbonate compound is carbon-captured.

14. The method of claim 10, wherein the synthesized oxide compound comprises one or more of an alkali oxide compound, an alkaline oxide compound, a transition metal oxide compound and a crystallogen oxide compound.

15. The method of claim 10, wherein the secondary component comprises one or more of a silicate, an alumina, an oxide, water, a cellulose-based component, a lignin-based component, and a hemicellulose-based component.

16. The method of claim 10, wherein the carbon-modified product includes one or more of a concrete product, a steel product, an asphalt product, and a plastic product.

17. The method of claim 10, further comprising determining a net benefit of the carbon-modified product as a difference between a value of the economic benefit associated with the carbon-modified product and a cost associated with preparing the carbon-modified product.

18. A carbon-modified product prepared according to the method of claim 10, the carbon-modified product having the economic benefit associated therewith.

19. A method for optimizing production of products, the method comprising:
determining a cost associated with preparing each of a plurality of carbon-modified products, each carbon-modified product being prepared by a method that includes carrying out one or more production steps effective to impart an economic benefit related to one or both of a carbon incentive and a climate incentive;

determining the value of the economic benefit associated with each carbon-modified product;

determining, for each carbon-modified product, a net benefit as a difference between a value of the economic benefit associated with each of the plurality of carbon-modified products and a cost associated with preparing each of the plurality of carbon-modified products; and forming one or more of the plurality of carbon-modified products such that the net benefit has a positive value.

20. The method of claim 19, wherein determining the cost associated with preparing each of the plurality of carbon-modified products comprises determining, for each of the plurality of carbon-modified products, a cost associated with removing carbon dioxide from a starting carbonate compound to synthesize an oxide compound.

21. The method of claim 19, wherein determining the cost associated with preparing each of the plurality of carbon-modified products comprises determining, for each of the plurality of carbon-modified products, a cost associated with combining a synthesized oxide compound with a secondary component to form the intermediate material.

22. The method of claim 21, wherein determining the cost associated with preparing each of the plurality of carbon-modified products further comprises determining, for each of the plurality of carbon-modified products, a cost associated with adding carbon dioxide to the intermediate material such that at least a majority of the carbon dioxide that is added to the intermediate material is combined with the intermediate material.

23. The method of claim 19, wherein determining the cost associated with preparing each of the plurality of carbon-modified products comprises determining, for each of the plurality of carbon-modified products, a cost associated with adding carbon dioxide to a synthesized oxide compound that is at least partially in solid form such that at least a majority of the carbon dioxide reacts with the synthesized oxide compound to form a synthesized carbonate compound that is at least partially in solid form.

24. The method of claim 23, wherein determining the cost associated with preparing each of the plurality of carbon-modified products further comprises determining, for each of the plurality of carbon-modified products, a cost associated with combining the synthesized carbonate compound with a secondary component to form the carbon-modified product.

25. The method of claim 19, wherein determining the value of the economic benefit associated with each carbon-modified product comprises determining at least a portion of a carbon-dioxide sequestration credit for and associated with each product, the carbon dioxide sequestration credit being redeemable based on one or both of construction of and financing of an entity incorporating the product.

26. The method of claim 19, wherein determining the value of the economic benefit associated with each carbon-modified product comprises determining a value of one or more of a tax credit, a tax inapplicability, a tradable value, a transferrable value, a carbon standard, a climate standard, a carbon benefit designation, a climate benefit designation, a carbon benefit certification, and a climate benefit certification.

27. A method for preparing a product, the method comprising forming a product by carrying out one or more production steps effective to impart an economic benefit related to one or both of a carbon incentive and a climate incentive so that the product so-produced has a value that is greater than the cost of production, such value being at least partially attributable to one or both of the carbon incentive and the climate incentive.

28. The method of claim 27, wherein the one or more production steps effective to impart an economic benefit related to one or both of a carbon incentive and a climate incentive includes combining a synthesized oxide compound with a secondary component to form an intermediate material.

29. The method of claim 28, wherein the one or more production steps effective to impart an economic benefit related to one or both of a carbon incentive and a climate incentive further includes adding carbon dioxide to the intermediate material such that at least a majority of the carbon dioxide that is added to the intermediate material is combined with the intermediate material to form a carbon-modified product.

30. The method of claim 27, wherein the one or more production steps effective to impart an economic benefit related to one or both of a carbon incentive and a climate incentive includes adding carbon dioxide to a synthesized oxide compound that is at least partially in solid form such that at least a majority of the carbon dioxide reacts with the synthesized oxide compound to form a synthesized carbonate compound that is at least partially in solid form.

31. The method of claim 30, wherein the one or more production steps effective to impart an economic benefit related to one or both of a carbon incentive and a climate incentive includes further includes combining the synthesized carbonate compound with a secondary component to form a carbon-modified product.

32. The method of claim 27, wherein the one or more production steps effective to impart an economic benefit related to one or both of a carbon incentive and a climate incentive includes utilizing one or both of heat and power that is transferred from a further process that captures carbon.

33. The method of claim 27, wherein the economic benefit related to one or both of a carbon incentive and a climate incentive includes one or more of a tax credit, a tax inapplicability, a tradable value, a transferrable value, a carbon standard, a climate standard, a carbon benefit designation, a climate benefit designation, a carbon benefit certification, and a climate benefit certification.

* * * * *